United States Patent
Jang et al.

(10) Patent No.: US 12,457,635 B2
(45) Date of Patent: Oct. 28, 2025

(54) METHOD AND DEVICE FOR SUPPORTING RANDOM ACCESS FOR LOW-CAPABILITY TERMINAL IN WIRELESS COMMUNICATION SYSTEM

(71) Applicant: SAMSUNG ELECTRONICS CO., LTD., Suwon-si (KR)

(72) Inventors: Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 17/995,056

(22) PCT Filed: Mar. 31, 2021

(86) PCT No.: PCT/KR2021/004024
§ 371 (c)(1),
(2) Date: Sep. 29, 2022

(87) PCT Pub. No.: WO2021/201611
PCT Pub. Date: Oct. 7, 2021

(65) Prior Publication Data
US 2023/0132057 A1 Apr. 27, 2023

(30) Foreign Application Priority Data

Mar. 31, 2020 (KR) .......... 10-2021-0042196
Apr. 1, 2020 (KR) .......... 10-2020-0039862

(51) Int. Cl.
*H04W 74/0833* (2024.01)
*H04W 74/00* (2009.01)
*H04W 74/0838* (2024.01)

(52) U.S. Cl.
CPC ..... *H04W 74/004* (2013.01); *H04W 74/0833* (2013.01); *H04W 74/0838* (2024.01)

(58) Field of Classification Search
None
See application file for complete search history.

(56) References Cited

U.S. PATENT DOCUMENTS 10,952,251 B2 3/2021 Kim et al.
2019/0215713 A1 7/2019 Breuer et al.
(Continued)

FOREIGN PATENT DOCUMENTS

KR 10-2019-0040324 A 4/2019
KR 10-2021-0020397 A 2/2021
WO 2018/164553 A2 9/2018

OTHER PUBLICATIONS

Samsung, "Overall view on NR evolution in Rel-17", RP-191500, 3GPP TSG-RAN Meeting #84, Newport Beach, CA, USA, Jun. 10-14, 2019, 20 pages.
(Continued)

*Primary Examiner* — Jenkey Van

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an embodiment of the present disclosure, a method of a terminal in a wireless communication system includes: receiving system information including a first parameter set for a random access of a type 1 terminal, a second parameter set for a random access of a type 2 terminal, and an indicator indicating whether the type 2 terminal is supported; in case that the terminal is the type 2 terminal, identifying whether a cell on which the system (Continued)

information is transmitted is available to access based on the indicator; and in case that the cell is identified to be available to access, transmitting a random access preamble based on the second parameter set, wherein a bandwidth supported by the type 2 terminal is less than a first threshold value and a data rate supported by the type 2 terminal is less than a second threshold value.

20 Claims, 9 Drawing Sheets

(56) References Cited

U.S. PATENT DOCUMENTS

| | | | |
|---|---|---|---|
| 2019/0306893 A1 | 10/2019 | Ly et al. | |
| 2021/0400682 A1* | 12/2021 | Liu | H04L 1/1812 |
| 2022/0159700 A1* | 5/2022 | Maleki | H04W 72/23 |
| 2022/0279595 A1 | 9/2022 | Jang et al. | |
| 2022/0287102 A1* | 9/2022 | Futaki | H04W 74/0833 |
| 2023/0007702 A1* | 1/2023 | Park | H04L 5/0094 |
| 2023/0008907 A1* | 1/2023 | He | H04W 72/30 |
| 2023/0104916 A1* | 4/2023 | Ohara | H04W 74/0833 370/329 |
| 2023/0164845 A1* | 5/2023 | Li | H04L 1/1854 370/329 |
| 2023/0328734 A1* | 10/2023 | Fan | H04W 72/20 370/336 |

OTHER PUBLICATIONS

Ericsson, "NR-Lite for Industrial Sensors and Wearables", RP-191047, 3GPP TSG-RAN Meeting #84, Newport Beach, CA, USA, Jun. 3-6, 2019, 11 pages.

International Search Report and Written Opinion of the International Searching Authority dated Jul. 6, 2021, in connection with International Application No. PCT/KR2021/004024, 9 pages.

* cited by examiner

METHOD AND DEVICE FOR SUPPORTING RANDOM ACCESS FOR LOW-CAPABILITY TERMINAL IN WIRELESS COMMUNICATION SYSTEM

CROSS-REFERENCE TO RELATED APPLICATIONS

This application is a 371 of International Application No. PCT/KR2021/004024, filed Mar. 31, 2021, which claims priority to Korean Patent Application No. 10-2021-0042196, filed Mar. 31, 2021, and Korean Patent Application No. 10-2020-0039862 filed Apr. 1, 2020, the disclosures of which are herein incorporated by reference in their entirety.

BACKGROUND

1. Field

The disclosure relates to a method for performing random access by a 'NR-light/NR-lite' terminal with lowered price and reduced complexity in a wireless communication system, particularly, in 3GPP 5G New Radio (NR).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Along with the recent advancement of Long Term Evolution (LTE), LTE-Advanced, and New Radio (NR), there is a need for a method and apparatus for an NR-light/lite terminal with a low processing speed to perform random access to a base station in which a normal NR terminal operates.

SUMMARY

An object of the disclosure is to propose a method by which an NR-lite terminal with low capability can perform random access.

According to an embodiment of the disclosure for solving the above problem, a method of a terminal in a wireless communication system includes: receiving system information including a first parameter set for a random access of a type 1 terminal, a second parameter set for a random access of a type 2 terminal, and an indicator indicating whether the type 2 terminal is supported; in case that the terminal is the type 2 terminal, identifying whether a cell on which the system information is transmitted is available to access based on the indicator; and in case that the cell is identified to be available to access, transmitting a random access preamble based on the second parameter set, wherein a bandwidth supported by the type 2 terminal is less than a first threshold value and a data rate supported by the type 2 terminal is less than a second threshold value.

Further, according to another embodiment of the disclosure, a method of a base station in a wireless communication system includes: transmitting system information including a first parameter set for a random access of a type 1 terminal, a second parameter set for a random access of a type 2 terminal, and an indicator indicating whether the type 2 terminal is supported; and in case that the indicator indicates that the type 2 terminal is supported, receiving, from the type 2 terminal, a random access preamble which is based on the second parameter set, wherein a bandwidth supported by the type 2 terminal is less than a first threshold value and a data rate supported by the type 2 terminal is less than a second threshold value.

Further, according to another embodiment of the disclosure, a terminal in a wireless communication system includes: a transceiver, and a controller configured to: control the transceiver to receive system information including a first parameter set for a random access of a type 1 terminal, a second parameter set for a random access of a type 2 terminal, and an indicator indicating whether the type 2 terminal is supported, in case that the terminal is the type 2 terminal, identify whether a cell on which the system information is transmitted is available to access based on the indicator, and in case that the cell is identified to be available to access, control the transceiver to transmit a random access preamble based on the second parameter set, wherein a bandwidth supported by the type 2 terminal is less than a first threshold value and a data rate supported by the type 2 terminal is less than a second threshold value.

Further, according to another embodiment of the disclosure, a base station in a wireless communication system includes: a transceiver; and a controller configured to control the transceiver to transmit system information including a first parameter set for a random access of a type 1 terminal, a second parameter set for a random access of a type 2 terminal, and an indicator indicating whether the type 2 terminal is supported, and in case that the indicator indicates that the type 2 terminal is supported control the transceiver to receive, from the type 2 terminal, a random access preamble which is based on the second parameter set, wherein a bandwidth supported by the type 2 terminal is less than a first threshold value and a data rate supported by the type 2 terminal is less than a second threshold value.

According to an embodiment of the disclosure, an NR-lite terminal with a low processing speed can perform random access to a base station in which a normal NR terminal operates, so that it is possible to increase the utilization of radio frequencies.

DETAILED DESCRIPTION

Figure 1:
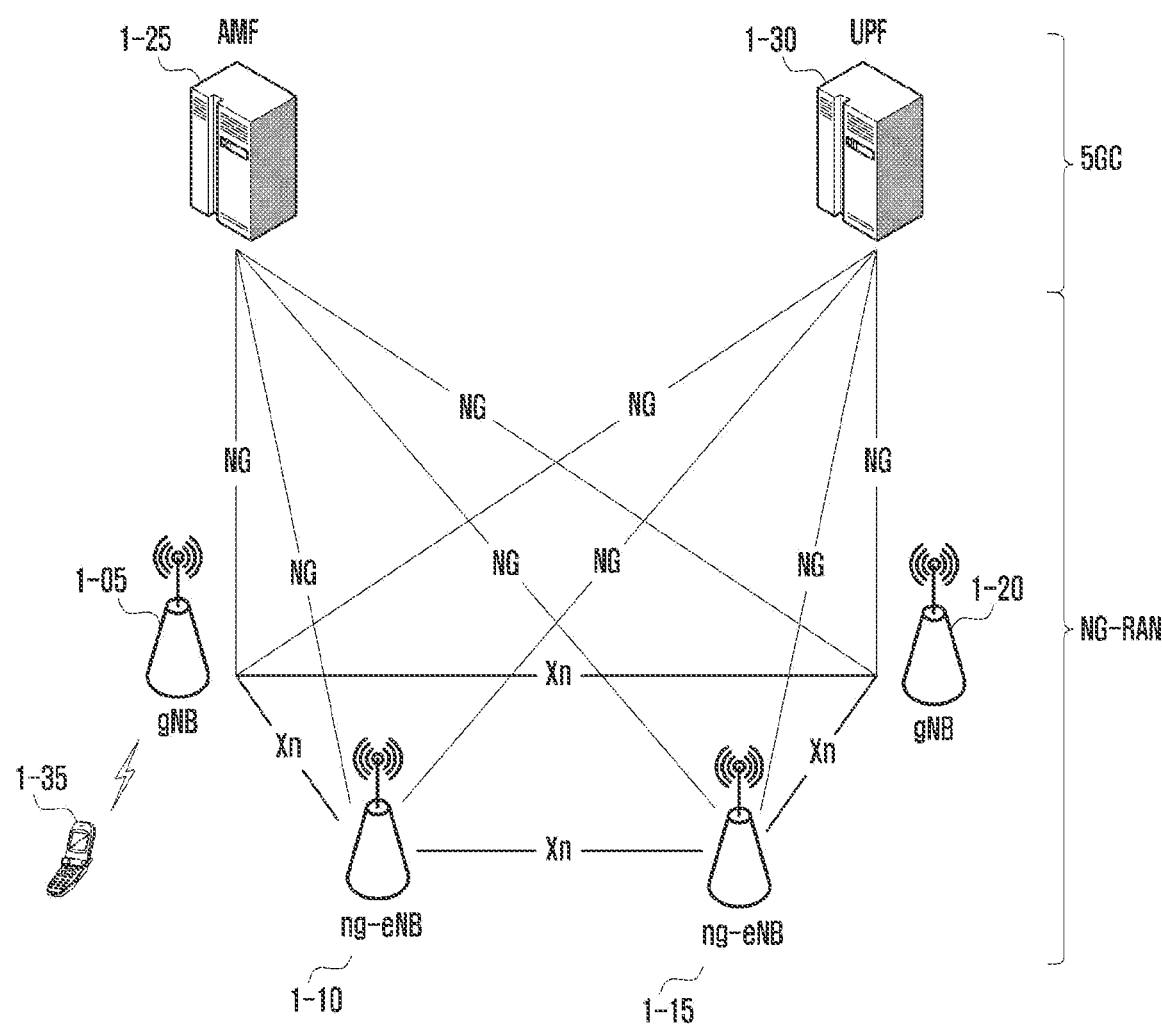
FIG. 1 is a diagram illustrating the architecture of an NR system, which is referred to for the description of the disclosure.

In the following description of embodiments of the disclosure, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Further, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit". "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. Further, the terms described below are defined in consideration of their functions in the disclosure, and these may vary depending on the intention of the user, the operator, or the custom. Hence, their meanings should be determined based on the overall contents of this specification.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in LTE and NR standards, which are the latest standards defined by the 3rd Generation Partnership Project (3GPP) organization among communication standards that currently exist. However, the disclosure is not limited by the above terms and names, and may be equally applied to systems conforming to other standards. In particular, the disclosure is applicable to 3GPP NR (5th generation mobile communication standards).

FIG. 1 is a diagram illustrating the architecture of an NR system, which is referred to for the description of the disclosure. With reference to FIG. 1, the wireless communication system may be composed of plural base stations 1-05, 1-10, 1-15 and 1-20, Access and Mobility Management Function (AMF) 1-20, and User Plane Function (UPF) 1-30. A user equipment (UE or terminal) 1-35 may connect to an external network through the base station 1-05, 1-10, 1-15 or 1-20 and the UPF 1-30.

The base stations 1-05, 1-10, 1-15 and 1-20 are access nodes of the cellular network and may provide radio access to UEs connecting to the network. That is, the base stations 1-05, 1-10, 1-15 and 1-20 may support the connection between the UEs and the core network (CN, in particular, the CN of NR is called 5GC) to service users' traffic, where they can perform scheduling by collecting state information of the UEs such as buffer status, available transmission power status, and channel status. Meanwhile, in communication, the user plane (UP) related to actual user data transmission and the control plane (CP) related to connection management can be divided and separately configured; in this drawing, next-generation node Bs (gNB) 1-05 and 1-20 may use UP and CP techniques defined in the NR technology, and ng-eNBs 1-10 and 1-15 being an eNB capable of interworking with the 5GC and gNBs may use UP and CP techniques defined in the LTE technology although being connected to the 5GC.

The AMF/SMF (session management function) 1-25 is an entity responsible for various control functions as well as a mobility management function for the UEs and is connected to plural base stations, and the UPF 1-30 is a kind of gateway device that provides data transfer.

Figure 2:
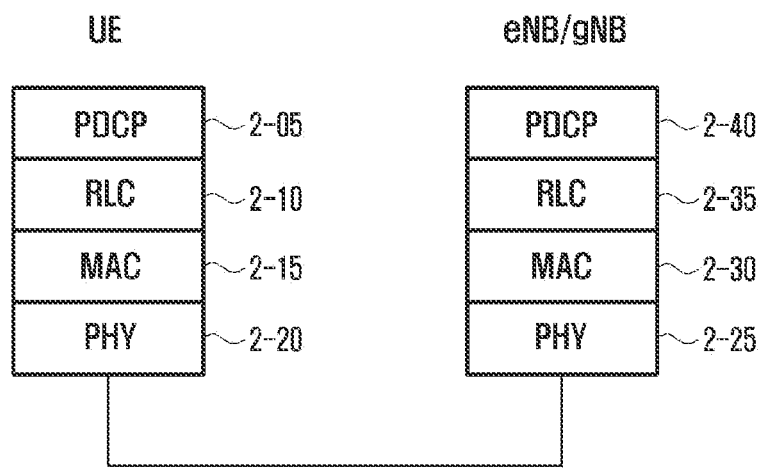
FIG. 2 is a diagram illustrating the structure of radio protocols in LTE and NR systems, which is referred to for the description of the disclosure.

FIG. 2 is a diagram illustrating the structure of radio protocols in LTE and NR systems, which is referred to for the description of the disclosure.

With reference to FIG. 2, in a UE or an evolved node (eNB)/gNB, the radio protocols of the LTE or NR system may be composed of packet data convergence protocol (PDCP) 2-05 or 2-40, radio link control (RLC) 2-10 or 2-35, and medium access control (MAC) 2-15 or 2-30. The packet data convergence protocol (PDCP) 2-05 or 2-40 may perform compression and decompression of IP headers, and the radio link control (RLC) 2-10 or 2-35 may reconfigure PDCP PDUs (packet data unit) to a suitable size. The MAC 2-15 or 2-30 may be connected with multiple RLC entities in a UE, and it may multiplex RLC PDUs into MAC PDUs and demultiplex MAC PDUs into RLC PDUs. The physical layer (PHY) 2-20 or 2-25 may convert higher layer data into OFDM symbols by means of channel coding and modulation and transmit the OFDM symbols through a wireless channel, or it may demodulate OFDM symbols received through a wireless channel, perform channel decoding, and forward the result to a higher layer. Further, in the physical layer, HARQ (hybrid ARQ) is used for additional error correction, and the receiving end transmits one bit indicating reception of a packet transmitted from the transmitting end. This is called HARQ ACK/NACK information. In LTE, downlink HARQ ACK/NACK information for an uplink data transmission may be transmitted through PHICH (Physical Hybrid-ARQ Indicator Channel); in NR, it can be determined whether retransmission or new transmission is required based on scheduling information of the corresponding UE on Physical Dedicated Control CHannel (PDCCH), which is a channel through which downlink/uplink resource allocation, etc. are transmitted. This is because asynchronous HARQ is applied in NR. Uplink HARQ ACK/NACK information for a downlink data transmission may be transmitted through Physical Uplink Control Channel (PUCCH) or Physical Uplink Shared Channel (PUSCH). The PUCCH is generally transmitted in the uplink of the PCell to be described later, but when the UE supports, the PUCCH may be additionally provided with the UE by the base station via a SCell to be described later, which is referred to as PUCCH SCell.

Although not shown in the drawing, the Radio Resource Control (RRC) layer is present on top of the PDCP layer of each of the UE and the base station, and the RRC layers may transmit and receive connection and measurement related control messages for radio resource control.

Meanwhile, the PHY layer may be composed of one or plural frequencies/carriers, and a technique for simultaneously configuring and using a plurality of frequencies in one base station is called carrier aggregation (CA). A single carrier may be used for communication between the UE and the base station (eNB in LTE or gNB in NR), but when CA is employed, a primary carrier and one or more secondary carriers may be used for communication, significantly increasing the data transfer rate by an amount corresponding to the number of additional secondary carriers. Meanwhile, in LTE, a cell in a base station utilizing a primary carrier is called a primary cell (PCell), and a cell utilizing a secondary carrier is called a secondary cell (SCell). A technology in which the CA function is extended to two base stations is called dual connectivity (DC). In DC, the UE connects to a master base station (master E-UTRAN NodeB, referred to as MeNB) and a secondary base station (secondary E-UTRAN NodeB, referred to as SeNB) at the same time; cells belonging to the MeNB are called a master cell group (MCG), and cells belonging to the SeNB are called a secondary cell group (SCG). There is a representative cell for each cell group; the representative cell of the MCG is called a primary cell (PCell), and the representative cell of the SCG is called a primary secondary cell (PSCell). When using NR described above, the UE can utilize LTE and NR at the same time by using the MCG based on LTE technology and the SCG based on NR technology. In NR, for each cell group (i.e., MCG or SCG), a maximum of 16 serving cells may be provided (PCell and SCells for MCG; PSCell and SCells for SCG).

Although not shown in the drawing, the Radio Resource Control (RRC) layer is present on top of the PDCP layer of each of the UE and the base station, and the RRC layers may transmit and receive connection and measurement related configuration control messages for radio resource control. For example, it is possible to instruct the UE to perform measurement by using a RRC layer message, and the UE may report the measurement result to the base station by using a RRC layer message.

Figure 3:
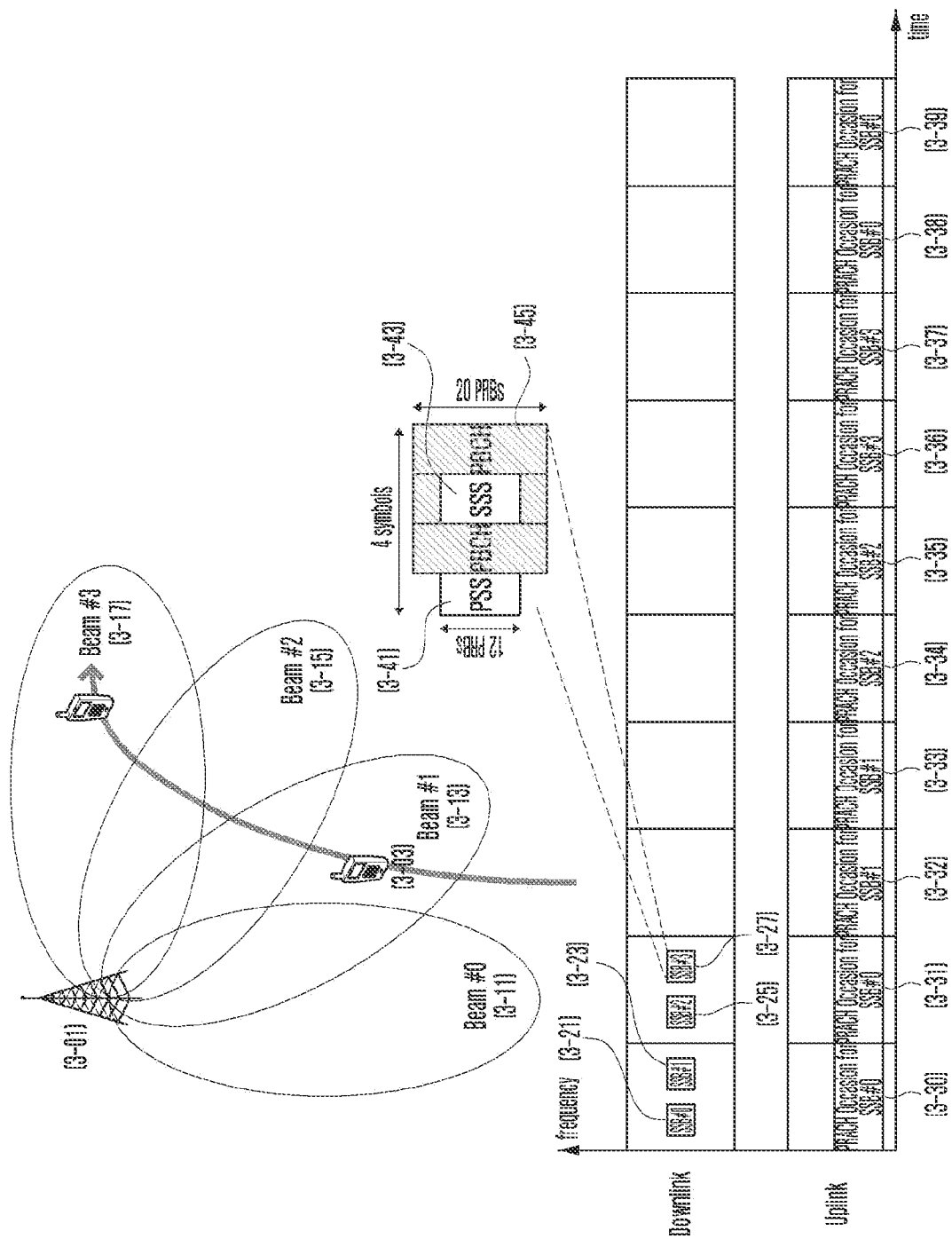
FIG. 3 is a diagram illustrating frame structures of downlink and uplink channels when beam-based communication is performed in an NR system.

FIG. 3 is a diagram illustrating frame structures of downlink and uplink channels when beam-based communication is performed in an NR system.

In FIG. 3, to transmit a wider-coverage or stronger signal, the base station 3-01 may transmit a signal in the form of a beam (3-11, 3-13, 3-15, 3-17). Correspondingly, the UE 3-03 in a cell may transmit and receive data by using a specific beam transmitted by the base station (beam #1 (3-13) in this drawing).

Meanwhile, depending on whether the UE is connected to the base station, the state of the UE may be divided into idle mode (RRC_IDLE) state and connected mode (RRC_CONNECTED) state. Accordingly, the base station may be unaware of the location of the UE in idle mode state.

If the UE in idle mode state wants to transition to connected mode state, it may receive synchronization signal blocks (SSBs) 3-21, 3-23, 3-25 and 3-27 transmitted by the base station. This SSB is an SSB signal that is periodically transmitted according to the periodicity set by the base station, and individual SSBs may be divided into Primary Synchronization Signal (PSS) 3-41, Secondary Synchronization Signal (SSS) 3-43, and Physical Broadcast CHannel (PBCH).

In this illustrative drawing, a scenario in which SSBs are transmitted for each beam is assumed. For example, it is assumed that SSB #0 (3-21) is transmitted using beam #0 (3-11), SSB #1 (3-23) is transmitted using beam #1 (3-13), SSB #2 (3-25) is transmitted using beam #2 (3-15), and SSB #3 (3-27) is transmitted using beam #3 (3-17). In this illustrative drawing, it is assumed that the UE in idle mode is located at beam #1, but when a UE in connected mode performs random access, the UE may select the SSB received at the time of performing random access.

Accordingly, in this drawing, SSB #1 transmitted through beam #1 may be received. Upon receiving SSB #1, the UE may obtain a physical cell identifier (PCI) of the base station through the PSS and SSS and receive the PBCH, so that it can identify the identifier (i.e., #1) of the currently received SSB, identify the position of the currently received SSB within a 10 ms frame, identify the SFN of the currently received SSB within the system frame number (SFN) having a periodicity of 10.24 seconds. In addition, the PBCH includes a master information block (MIB), and this MIB can notify the location at which system information block type 1 (SIB1), which broadcasts more detailed cell configuration information, can be received. Upon receiving SIB1, the UE may identify the total number of SSBs transmitted by this base station, and identify the locations of physical random access channel (PRACH) occasions (in this illustrative drawing, a scenario in which a PRACH occasion is allocated every 1 ms is assumed: from 3-30 to 3-39) at which random access can be performed for transitioning to connected mode state (more precisely, a preamble, which is a physical signal specially designed for uplink synchronization, can be transmitted). Further, based on the above information, it is possible to identify which PRACH occasion among the PRACH occasions is mapped to which SSB index. For example, in this illustrative drawing, a scenario in which a PRACH occasion is allocated every 1 ms is assumed, and a scenario in which ½ SSB is allocated per PRACH occasion (i.e., 2 PRACH occasions per SSB) is assumed. Accordingly, a scenario in which, from the start of the PRACH occasion that starts according to the SFN value, two PRACH occasions are allocated for each SSB is illustrated. That is, PRACH occasions 3-30 and 3-31 are allocated for SSB #0, PRACH occasions 3-32 and 3-33 are allocated for SSB #1, and so on. After assignment for all SSBs, PRACH occasions 3-38 and 3-39 may be allocated again for the first SSB.

Accordingly, the UE may identify the location of PRACH occasions 3-32 and 3-33 for SSB #1, and then it may transmit a random access preamble at the earliest PRACH occasion (e.g., 3-32) from the current time point among PRACH occasions 3-32 and 3-33. The base station having received the preamble at PRACH occasion 3-32 can be aware that the corresponding UE has selected SSB #1 and transmitted the preamble, and hence it can transmit and receive data through the corresponding beam when performing subsequent random access.

Meanwhile, when the UE in connected state moves from the current (source) base station to the target base station due to handover or the other, the UE performs random access to the target base station, where the UE may select an SSB and perform an operation of transmitting random access as described above. Further, during handover, a handover command is transmitted to the UE to move from the source base station to the target base station, in which case the above message may allocate a dedicated random access preamble identifier to the corresponding UE for each SSB of the target base station so as to be used when performing random access to the target base station. Here, the base station may not allocate a dedicated random access preamble identifier to all beams (according to the current location of the UE or the other), and a dedicated random access preamble may be not allocated to some SSBs correspondingly (e.g., dedicated random access preamble allocated only to beam #2 and beam #3). If a dedicated random access preamble is not allocated to the SSB selected by the UE for preamble transmission, the UE may randomly select a contention-based random access preamble to perform random access. For example, in this drawing, a scenario is possible in which after the UE initially performs random access at beam #1 but fails, the UE transmits a dedicated preamble at beam #3 when transmitting a random access preamble again. In random access, that is, within one random access procedure, when preamble retransmission occurs, a contention-based random access process and a contention-free random access process may be mixed depending on whether a dedicated random access preamble is allocated to the SSB selected for each preamble transmission.

Figure 4:
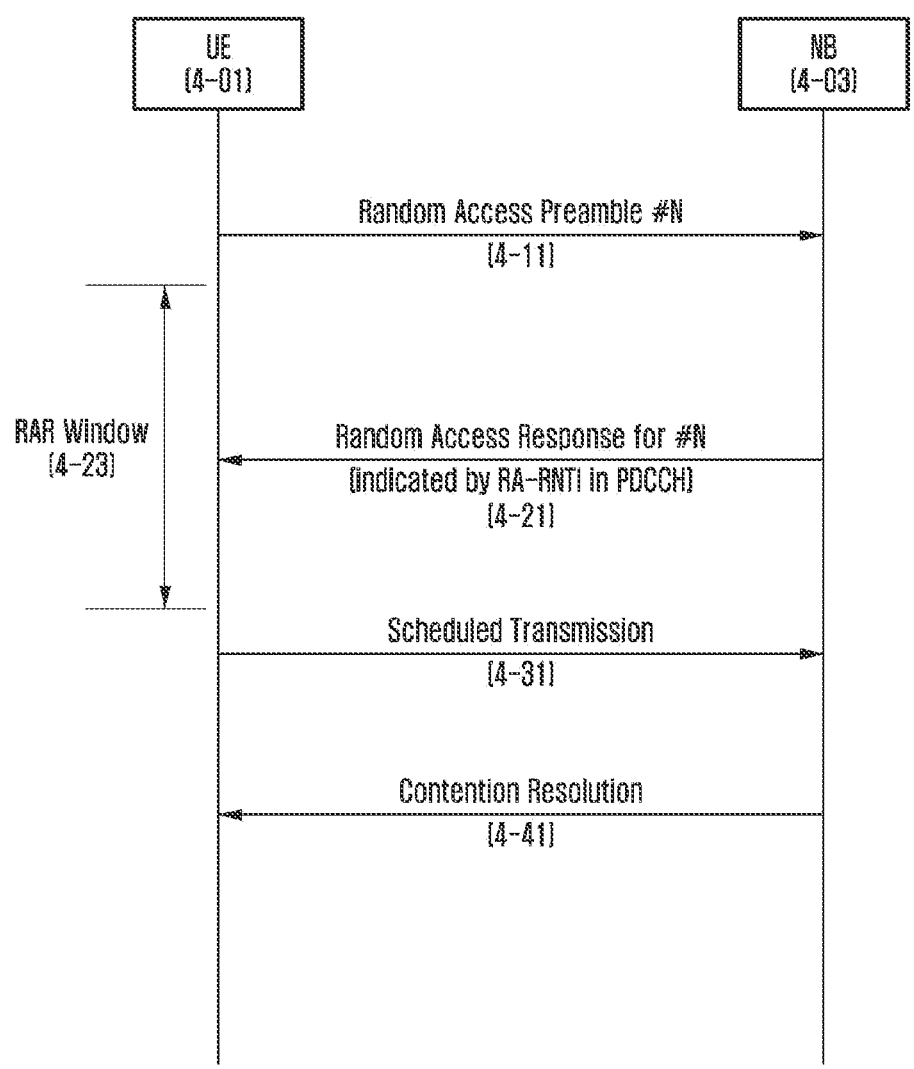
FIG. 4 is a diagram illustrating a procedure in which a UE performs contention-based 4-step random access to a base station.

FIG. 4 is a diagram illustrating a contention-based four-step random access procedure performed by the UE in various cases requiring random access to the base station such as initial access, reconnection, and handover.

To access the base station 4-03, the UE 4-01 may select a PRACH according to the description of FIG. 3 and transmit a random access preamble via the corresponding PRACH (4-11). A case in which one or more UEs simultaneously transmit a random access preamble via the PRACH resource may occur. The PRACH resource may span one subframe, or only some symbols within one subframe may be used. The information on the PRACH resources is included in the system information broadcast by the base station, and hence it is possible to identify which time-frequency resource should be used to transmit a preamble. In addition, the random access preamble is a specific sequence specially designed so that it can be received even if it is transmitted before being completely synchronized with the base station, and there may be a plurality of preamble identifiers (indexes) according to the standards; if there are plural preamble identifiers, the preamble transmitted by a UE may be one randomly selected by the terminal or may be a specific one designated by the base station.

Upon receiving the preamble, the base station may transmit a random access response (RAR) message (also referred to as Msg2) to the UE (4-21). The RAR message may include identifier information of the preamble used at step 4-11, and may include uplink transmission timing adjustment information, uplink resource allocation information to be used at a subsequent step (i.e., step 4-31), temporary UE identifier information, and the like. For example, when plural UEs attempt random access by transmitting different preambles at step 4-11, the RAR message may include responses for the individual preambles, in which case the preamble identifier information may be transmitted to indicate which preamble the corresponding response is for. The uplink resource allocation information, which is included in each response for each preamble, is detailed information about the resource to be used by the UE at step 4-31, and may include the physical location and size of the resource, a modulation and coding scheme (MCS) used for transmission, power adjustment information during transmission, and the like. The temporary UE identifier information may be a value transmitted to be used in a case where the UE, which has transmitted the preamble but does not have an identifier assigned by the base station for communication with the base station, performs initial access.

Meanwhile, the RAR message may optionally include a backoff indicator (BI) in addition to response(s) to the individual preambles. The backoff indicator may be a value transmitted to delay transmission randomly according to the value thereof rather than immediately retransmitting the preamble when the random access preamble needs to be retransmitted because of unsuccessful random access. More specifically, when the UE does not properly receive the RAR, or contention resolution, which will be described later, is not properly achieved, it may have to retransmit the random access preamble. Here, the value indicated by the backoff indicator may be an index in Table 1 below, and the UE may randomly select a value from the range of 0 to the value indicated by the index and retransmit the random access preamble after a time corresponding to the selected value. For example, in case that the base station indicates 5 (i.e., 60 ms) as a BI value, when the UE randomly selects a value of 23 ms from the range of 0 to 60 ms, the UE may store the selected value in a variable called PREAMBLE_BACKOFF and perform a procedure of retransmitting the preamble after 23 ms. If the backoff indicator is not transmitted, when the random access preamble needs to be retransmitted because random access is not successfully performed, the UE may immediately transmit the random access preamble.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message should be transmitted within a preset period starting from a specific time after the preamble is transmitted, and this period is referred to as 'RAR window' 4-23. The RAR window may start from a point in time when a specific time has elapsed from the transmission of the first preamble. The specific time may have a subframe unit (1 ms) or smaller value. In addition, the length of the RAR window may be a specific value set by the base station for each PRACH resource or for each set of one or more PRACH resources in a system information message broadcast by the base station.

Meanwhile, when the RAR message is transmitted, the base station schedules the RAR message through the PDCCH, and corresponding scheduling information may be scrambled with a random access-radio network temporary identifier (RA-RNTI). The RA-RNTI is mapped to the PRACH resource used to transmit the message 4-11; the UE having transmitted a preamble via a specific PRACH resource may determine whether there is a corresponding RAR message by attempting to receive the PDCCH based on the corresponding RA-RNTI. That is, if the RAR message is a response to the preamble transmitted by the UE at step 4-11 as shown in this illustrative diagram, the RA-RNTI used for this RAR message scheduling information may include information on the transmission 4-11. To this end, the RA-RNTI can be calculated by Equation 1 below.

$$\text{RA-RNTI} = 1 + s\_id + 14 \times t\_id + 14 \times 80 \times f\_id + 14 \times 80 \times 8 \times ul\_carrier\_id \quad \text{[Equation 1]}$$

Here, s_id is an index corresponding to the first OFDM symbol at which the preamble transmission at step 4-11 is started, and may have a value of 0≤s_id<14 (i.e., maximum number of OFDM symbols in one slot). Also, t_id is an index corresponding to the first slot in which the preamble transmission at step 4-11 is started, and may have a value of 0≤t_id<80 (i.e., maximum number of slots in one system frame (10 ms)). Further, f_id indicates the ordinality of the PRACH resource on frequency through which the preamble at step 4-11 is transmitted, and may have a value of 0≤f_id<8 (i.e., maximum number of PRACHs on frequency within the same time). In addition, when two carriers are used in uplink for one cell, ul_carrier_id is a factor for discriminating whether the preamble is transmitted via the normal uplink (NUL) (0 in this case) or is transmitted via the supplementary uplink (SUL) (1 in this case).

Upon receiving the RAR message, the UE may transmit a different message over the resource allocated via the RAR message according to various purposes described above (4-31). It is the third message transmitted in this illustrative drawing and is also called Msg3 (that is, the preamble at step 4-11 is called Msg1, and the RAR at step 4-21 is called Msg2). As an example of Msg3 transmitted by the UE, an RRCSetupRequest message being an RRC layer message may be transmitted for initial access, an RRCReestablishmentRequest message may be transmitted for reconnection, and an RRCReconfigurationComplete message may be transmitted for handover. Alternatively, a buffer status report (BSR) message may be transmitted for requesting a resource.

Thereafter, the UE receives a contention resolution message from the base station (4-41) in case of initial transmission (i.e., when Msg3 does not include base station identifier information previously assigned to the UE, etc.); the contention resolution message includes the contents transmitted in Msg3 by the UE as it is, so that even if there are plural UEs that have selected the same preamble at step 4-11, the response for which UE may be notified.

Figure 5:
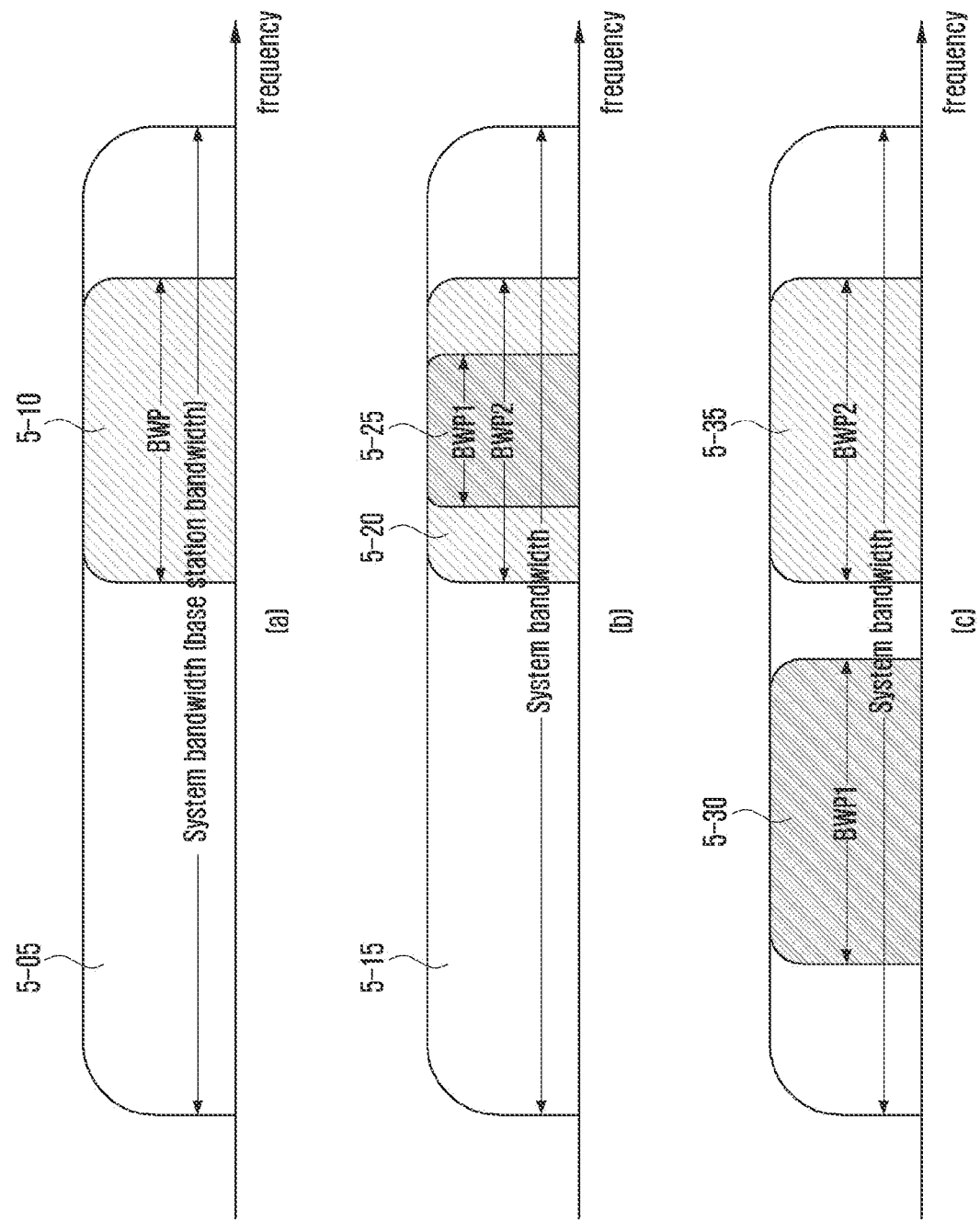
FIG. 5 is a diagram illustrating scenarios in which bandwidth parts are applied in a next-generation mobile communication system.

FIG. 5 is a diagram illustrating scenarios in which bandwidth parts are applied in a next-generation mobile communication system.

The technology of bandwidth part (BWP) application means that one UE performs communication using only a part of the system bandwidth used by one cell. The BWP may be used for manufacturing cost reduction or power saving of the UE. The BWP may be configured by the base station only for the UE supporting it.

With reference to FIG. 5, there are three major BWP operation scenarios.

A first scenario is to apply the BWP for a UE supporting only a frequency bandwidth 5-10 narrower than the system bandwidth 5-05 used by one cell. To reduce manufacturing cost, a specific terminal may be developed to support a limited frequency bandwidth. Such a UE should report to the base station that only the limited frequency bandwidth is supported, and the base station may configure a BWP less than or equal to the maximum bandwidth supported by the UE accordingly.

A second scenario is to apply the BWP for power saving of the UE. For example, a UE is performing communication by using the entire system bandwidth 5-15 used by one cell or a BWP 5-20 being a part thereof, but the communicating base station may configure a narrower BWP 5-25 for the purpose of power saving.

A third scenario is to apply separate BWPs in correspondence to different numerologies. The numerology refers to diversifying the physical layer configuration in order to implement optimal data transmission according to various service requirements. For example, in an OFDMA structure composed of multiple subcarriers, the spacing between subcarriers may be variably adjusted according to specific requirements. One UE can communicate by applying plural numerologies at the same time. At this time, as the physical layer settings corresponding to individual numerologies are different, it is preferable to apply different numerologies separately to different BWPs 5-30 and 5-35.

On the other hand, the BWP, by which the UE attempts to access when the UE transitions from RRC_IDLE state or inactive mode (RRC_INACTIVE) state to RRC_CONNECTED state, is called an initial BWP, and when the access to the base station is successful and the RRC_CONNECTED state is reached, the UE may be configured with an additional BWP by the base station. Here, one of the BWPs additionally configured by the base station may be set as a default BWP to be described later, and if a default BWP is not separately set, the initial BWP may become the default BWP.

Additionally, in the above scenario, the UE may be configured with plural BWPs, and thereafter, a specific BWP among the BWPs configured by the base station may be activated. For example, in the third scenario, the UE may be configured with BWP 1 (5-30) and BWP 2 (5-35), and the base station may activate one of the two BWPs. Accordingly, in each of the above scenarios, the UE can transmit and receive data through the active BWP for downlink and uplink.

Meanwhile, when plural BWPs are configured as described above, the UE may change the active BWP, which is referred to as BWP switching. This can be performed by allocating resources to the BWP to be switched to on the PDCCH transmitted by the base station.

Meanwhile, the same numerologies of the third scenario may also be applied in the unlicensed band. For example, in the unlicensed band, devices such as wireless LANs operate with a bandwidth of 20 MHz, and hence it is possible to configure a plurality of BWPs each corresponding to 20 MHz as shown by 5-30 and 5-35 in this drawing, and move the UEs to the individual BWPs according to the degree of congestion of the unlicensed band.

Taking the second scenario as an example, when the UE is in communication by using a wide bandwidth in the active PCell or SCell (5-15, 5-20) and scheduling is not performed for a certain period of time (bwp-InactivityTimer) set by the base station in the corresponding cell, the BWP of the UE may be changed or switched to the default BWP (e.g., 5-25) and the previously used BWP may be deactivated and the default BWP may be activated accordingly. Or, when the UE is in communication using a specific bandwidth (e.g., 5-25) and the base station instructs scheduling of another BWP via the PDCCH, the UE moves to the indicated BWP (e.g., 5-20), in which case the existing BWP may be deactivated and the indicated BWP may be activated. Here, the activated (i.e., currently used) BWP is called an active BWP.

On the other hand, NR is designed to support a wideband bandwidth (e.g., 100 MHz), but not all terminals need to support the wideband bandwidth. For example, a wearable device such as a smartwatch may require only a certain level of bandwidth for communication. As such, the need for a simple UE with only essential functions has emerged from the requirements of the existing NR UEs, and such a UE is referred to as 'NR-light/lite' UE. The NR-lite UE may have, for example, a bandwidth smaller than that of an existing NR UE, such as 10 MHz or 20 MHz, and may support only basic values including a subcarrier spacing (SCS) of 15 kHz. Also, the maximum supported data rate may be limited to 20 Mbps or the like.

Figure 6:
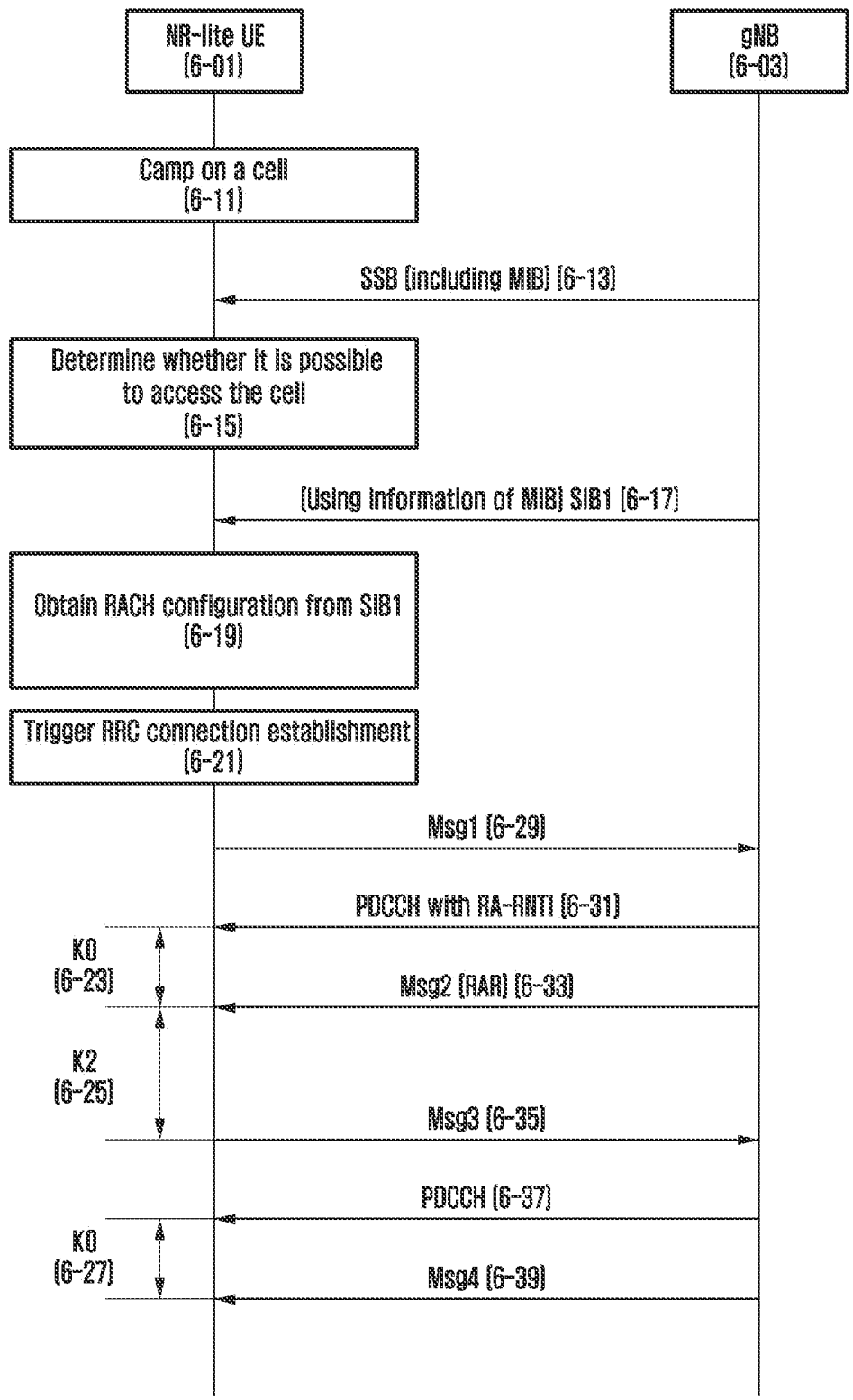
FIG. 6 is a diagram illustrating a sequence of messages flowing between a base station and UE when the NR-lite UE performs a random access procedure with the base station.

FIG. 6 is a diagram illustrating a sequence of messages flowing between a base station and UE when the NR-lite UE performs a random access procedure with the base station.

For convenience of description, a normal NR UE is referred to as a type 1 UE, and a UE with a bandwidth or speed limitation or slow processing speed, such as an NR-lite UE, is referred to as a type 2 UE.

In this drawing, assuming that the UE 6-01 is in idle mode (RRC_IDLE) state without a connection to the base station, the UE 6-01 may camp on (6-11) a base station where a signal is detected, to receive data transmitted from the network.

Thereafter, the UE may receive (6-13) an SSB transmitted from the corresponding base station 6-03. The SSB includes an MIB, and a detailed structure of the MIB is shown in Table 2.

TABLE 2

```
MIB ::= SEQUENCE {
systemFrameNumber BIT STRING (SIZE (6)),
subCarrierSpacingCommon ENUMERATED {scs15or60, scs30or120},
ssb-SubcarrierOffset INTEGER (0..15),
dmrs-TypeA-Position ENUMERATED {pos2, pos3},
pdcch-ConfigSIB1 PDCCH-ConfigSIB1,
cellBarred ENUMERATED {barred, notBarred},
intraFreqReselection ENUMERATED {allowed, notAllowed},
spare BIT STRING (SIZE (1))
}
```

Here, by using the information included in the MIB, the UE may first determine (6-15) whether the cell allows an NR-lite UE to access. As a method of the determination, a method of checking through subcarrier spacing information supported by the UE may be used, or a method of explicitly informing the UE whether the base station supports a NR-lite UE by using a spare bit may be considered. Alternatively, the UE may receive (6-17) an SIB1 by using pdcch-ConfigSIB1 information in the MIB, and determine whether a type 2 UE is supported based on the SIB1 received from the base station.

Meanwhile, the SIB1 may deliver various necessary parameters to UEs in the cell when the UE needs to perform random access to the corresponding base station. In particular, the base station may transmit (6-19) a first parameter set and a second parameter set related to random access to the UE through a RACH-ConfigCommon information element (IE: a unit used for data transmission). The first parameter set may be random access parameters commonly applied to a type 1 UE and a type 2 UE, and the second parameter set may be random access parameters separately applied to a type 1 UE and a type 2 UE. More specifically, the base station may include both the first parameter set and the second parameter set in a single RACH-ConfigCommon IE, or may separately transmit a RACH-ConfigCommon IE for the type 1 UE and a RACH-ConfigCommon IE for the type 2 UE.

If both the first parameter set and the second parameter set are included in one RACH-ConfigCommon IE, the UE may include the first parameter set within only one RACH-ConfigCommon IE. Examples of the first parameter set may include parameters related to uplink signal generation and transmission (prach-RootSequenceIndex, msg1-SubcarrierSpacing, msg3-transformPrecoder) and parameters related to uplink signal transmission power (preambleReceivedTargetPower, powerRampingStep). If both the first parameter set and the second parameter set are included in one RACH-ConfigCommon IE, the UE may include one or two second parameter sets in one RACH-configCommon IE. If one is included, it will be used commonly by a NR-lite UE and a normal NR UE; if two are included, the 1st second parameter set may be for a normal NR UE and the 2nd second parameter set may be for an NR-lite UE. Examples of the first parameter set may include parameters specifying the time-frequency resource of the PRACH resource being the physical channel through which the random access preamble is transmitted (prach-ConfigurationIndex, msg1-FDM, msg1-FrequencyStart, etc.), parameters related to determining success or failure of a random access procedure (preambleTransMax, ra-ResponseWindow, ra-ContentionResolutionTimer, etc.), parameters related to beams during random access (rsrp-ThresholdSSB, ssb-perRACH-OccasionAndCB-PreamblesPerSSB, etc.), parameters related to preamble groups (groupBconfigured), or parameters related to repeated transmission for increasing the success rate of preamble transmission of an NR-lite UE.

When using a method of separately transmitting a RACH-ConfigCommon IE for a type 1 UE and a RACH-ConfigCommon IE (RACH-ConfigCommonLight IE) for a type 2 UE, the two IEs may both be transmitted via an SIB1. Here, for IEs that are not signaled among the component IEs of RACH-ConfigCommon transmitted for a normal UE, predefined values in the standard may be used; in the case of the RACH-ConfigCommonLight IE transmitted for an NR-lite UE, it may be possible to consider using the same values as the values determined for the identical IEs of RACH-ConfigCommon for the IEs that are not signaled among the component IEs of the RACH-ConfigCommonLight. This is to reduce the overhead of parameters transmitted in duplication with the RACH-ConfigCommon IE.

Further, via the SIB1, values for a delay for receiving/transmitting actual data after scheduling during downlink or uplink transmission as well as random access may be set. For example, when the base station schedules uplink data, the delay from the scheduling (6-33) to the time point (6-35) at which uplink data is actually transmitted is called K2 (6-25); when the base station schedules downlink data, a delay from the scheduling (6-37) to the time point (6-39) at which downlink data is actually received is called K0 (6-23 or 6-27). In the case of a normal UE, up to 16 values may be set for both K0 and K2, and the maximum value that can be set may be 32 slots. For example, in case that the base station has configured two K0 values to the UE via SIB1 and has set the first and second values respectively to 4 slots and 16 slots, when the base station indicates the second value as the time domain resource assignment value to the UE during actual scheduling, the UE may receive downlink data after 16 slots from the time of receiving the corresponding scheduling information. However, in the case of an NR-lite UE, the maximum value of 32 slots may be not sufficient, and hence specific values of K0 and K2 may be set separately.

As an example, for K0, pdsch-TimeDomainAllocationList and pdsch-TimeDomainAllocationListLight may be included in PDSCH-ConfigCommon transmitted via an SIB1. If only pdsch-TimeDomainAllocationList is included among them, the NR-lite UE may determine K0 with this value; if both pdsch-TimeDomainAllocationList and pdsch-TimeDomainAllocationListLight are included, the NR-lite UE may determine K0 by using pdsch-TimeDomainAllocationListLight; if neither is included, K0 may be determined by using a default (i.e., pre-configured in the UE) table defined in 3GPP TS 38.214.

In addition, for K2, pusch-TimeDomainAllocationList and pusch-TimeDomainAllocationListLight may be included in PUSCH-ConfigCommon transmitted via SIB1. If only pusch-TimeDomainAllocationList is included among them, the NR-lite UE may determine K2 with this value; if both pusch-TimeDomainAllocationList and pusch-TimeDomainAllocationListLight are included, the NR-lite UE may determine K2 by using pusch-TimeDomainAllocationListLight; if neither is included, K2 may be determined by using a default (i.e., pre-configured in the UE) table defined in 3GPP TS 38.214.

Thereafter, when the UE needs to receive downlink data after receiving a paging message from the cell or uplink data to be transmitted is generated, the UE may have to perform (6-21) RRC connection establishment for receiving or transmitting the corresponding data. To this end, the UE needs to perform random access, and the UE may determine PRACH parameters to be used for the random access procedure based on RACH-ConfigCommon and RACH-ConfigCommonLight of SIB1 described above.

That is, the UE may have to select a PRACH resource to transmit a preamble; if the base station has separately signaled parameters (prach-ConfigurationIndex, msg1-FDM, msg1-FrequencyStart, etc.) specifying the time-frequency resource of the PRACH resource, the NR-lite UE may transmit (6-29) a preamble via a PRACH resource for the type 2 UE. If only one parameter set (prach-ConfigurationIndex, msg1-FDM, msg1-Frequency Start, etc.) for specifying the time-frequency resource of the PRACH resource is signaled in RACH-ConfigCommon, the UE may transmit (6-29) a preamble via a common PRACH resource.

Upon receiving this, the base station may transmit (6-33) an RAR to the UE. This RAR may include uplink scheduling information for subsequent Msg3 transmission. Here, the UE may transmit Msg3 after determining K2 for Msg3 transmission based on PUSCH-ConfigCommon of SIB1 described above. More specifically, if the NR-lite UE has used a separate PRACH resource for NR-lite when transmitting the preamble and pusch-TimeDomainAllocationListLight has been signaled, the UE may determine K2 by using pusch-TimeDomainAllocationListLight and time domain resource assignment of the UL grant of the RAR and transmit (6-35) the PUSCH (i.e., Msg3 in this example). In other words, it is possible to determine K2 by applying the value indicated by the time domain resource assignment in the UL grant received via a valid RAR to pusch-TimeDomainAllocationListLight, in correspondence to the preamble transmitted by the UE, and PUSCH transmission may be performed by applying K2 correspondingly. However, if a normal PRACH resource has been used when transmitting the preamble, or if a PRACH resource for NR-lite has been used but pusch-TimeDomainAllocationListLight is not signaled, the UE may determine K2 by using pusch-TimeDomainAllocationList and the time domain resource assignment of the RAR UL grant and transmit (6-35) the PUSCH (i.e., Msg3 in this example). In other words, it is possible to determine K2 by applying the value indicated by the time domain resource assignment in the UL grant received via a valid RAR to pusch-TimeDomainAllocationList, in correspondence to the preamble transmitted by the UE, and the UE may perform the PUSCH transmission by applying K2 correspondingly.

Then, after transmitting Msg3, the UE may receive (6-37) scheduling from the base station, and may receive (6-39) Msg4. Here, the UE may receive Msg4 after determining K0 for Msg4 reception based on PUSCH-ConfigCommon of SIB1 described above. More specifically, if the NR-lite UE has used a separate PRACH resource for NR-lite when transmitting the preamble and pdsch-TimeDomainAllocationListLight has been signaled, the UE may determine K0 by using pdsch-TimeDomainAllocationListLight and time domain resource assignment of the PDCCH (or, downlink control information (DCI)) (6-37) including UE scheduling information and receive the PDSCH (i.e., Msg4 in this example) (6-39). Further, the time domain resource assignment in the PDCCH having received (6-31) to receive the RAR message may also determine K0 by using pdsch-TimeDomainAllocationListLight.

However, if a normal PRACH resource has been used when transmitting the preamble, or if a PRACH resource for NR-lite has been used but pdsch-TimeDomainAllocationListLight is not signaled, when receiving (6-31) DCI addressed by a RA-RNTI, the UE may determine K0 by applying the value indicated by the time domain resource assignment of the DCI to PDSCH-TimeDomainResourceAllocationList and receive the RAR by applying K0; when receiving DCI (6-37) addressed by a temporary C-RNTI assigned in Msg2 for Msg4 reception, the UE may determine K0 by applying the value indicated by the time domain resource assignment of the DCI to PDSCH-TimeDomainResourceAllocationList and receive Msg4 by applying K0 correspondingly.

The NR-lite UE may perform random access by determining K0 and K2 as described above, and if parameters separately configured for NR-lite are included in SIB1, it may apply preambleTransMax, ra-ResponseWindow; ra-ContentionResolutionTimer, and RAR window length separately configured for NR-lite to perform RAR reception, Msg3 transmission, and determination of the successfulness of random access. However, if parameters separately configured for NR-lite are not included in SIB1, the UE may apply preambleTransMax, ra-ResponseWindow, ra-ContentionResolutionTimer, and RAR window length for a normal NR UE to perform RAR reception, Msg3 transmission, and determination of the successfulness of random access.

Figure 7:
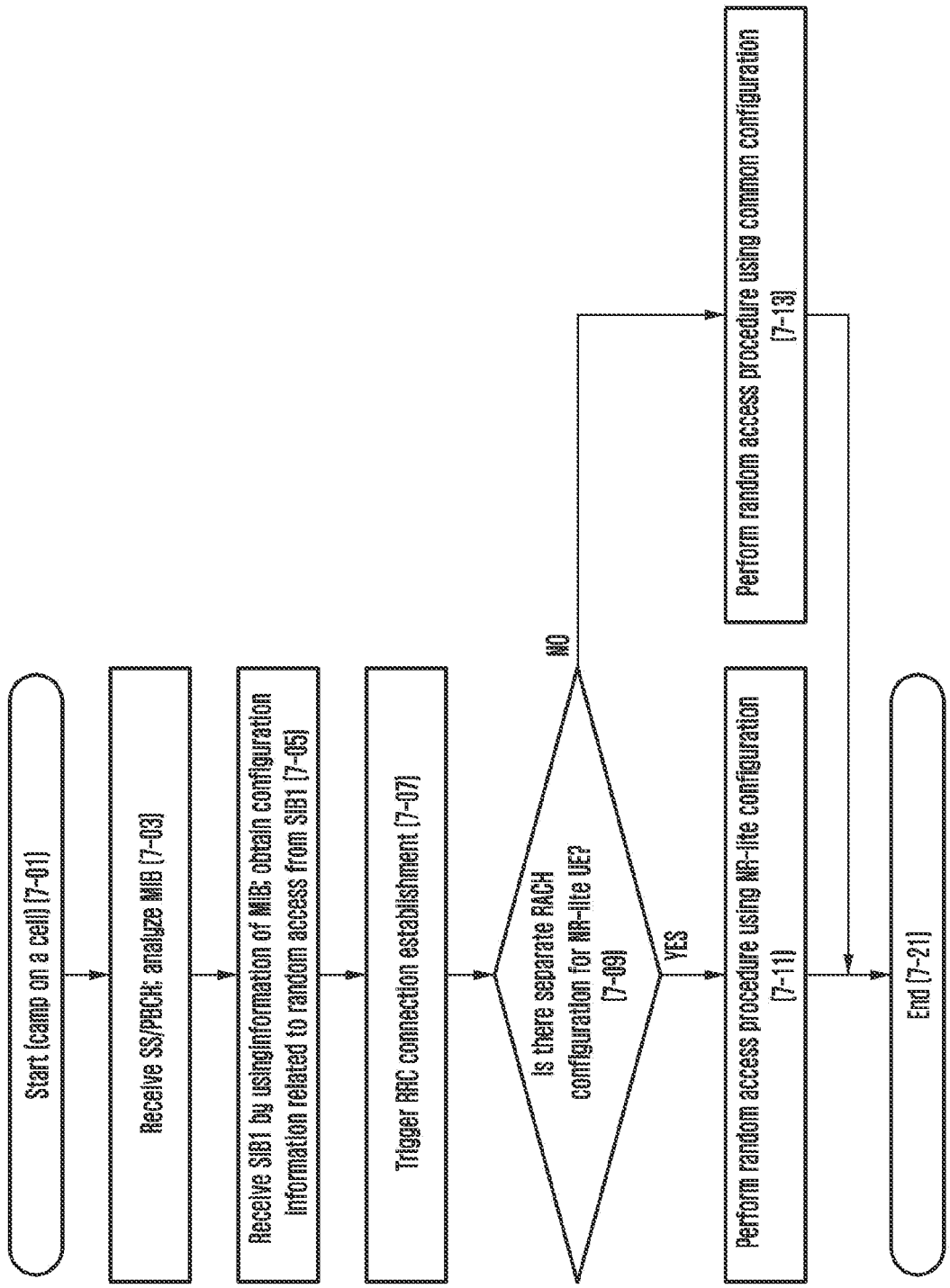
FIG. 7 is a flowchart illustrating a sequence of UE operations when the NR-lite UE performs a random access procedure with the base station.

FIG. 7 is a flowchart illustrating a sequence of UE operations when the NR-lite UE performs a random access procedure with the base station.

In this drawing, assuming that the UE is in idle mode (RRC_IDLE) state without a connection to the base station, the UE may camp on (7-01) a base station where a signal is detected to receive data transmitted from the network.

Thereafter, the UE may receive (7-03) an SSB transmitted from the corresponding base station. The SSB includes an MIB, and a detailed structure of the MIB is shown in Table 3.

TABLE 3

MIB ::= SEQUENCE {
systemFrameNumber BIT STRING (SIZE (6)),
subCarrierSpacingCommon ENUMERATED {scs15or60, scs30or120},
ssb-SubcarrierOffset INTEGER (0..15),
dmrs-TypeA-Position ENUMERATED {pos2, pos3},
pdcch-ConfigSIB1 PDCCH-ConfigSIB1,
cellBarred ENUMERATED {barred, notBarred},
intraFreqReselection ENUMERATED {allowed, notAllowed},
spare BIT STRING (SIZE (1))
}

Here, through the MIB (7-03) and/or SIB1 (7-05) indicated by the MIB, the UE may determine whether the cell allows an NR-lite UE to access. As a method of the determination, a method of checking whether subcarrier spacing information of the base station in the MIB corresponds to the subcarrier spacing supported by the UE may be used, or a method of explicitly informing the UE whether the base station supports a NR-lite UE by using a spare bit in the MIB may be considered. Alternatively, the UE may receive an SIB1 by using pdcch-ConfigSIB1 information in the MIB, and determine whether a type 2 UE is supported based on the SIB1 received from the base station.

Meanwhile, the UE may receive various parameters necessary for it to access the base station via the SIB1. In particular, the UE may receive (7-05) a first parameter set and a second parameter set related to random access in SIB1 through a RACH-ConfigCommon information element (IE: a unit used for data transmission). The first parameter set may be random access parameters commonly applied to a type 1 UE and a type 2 UE, and the second parameter set may be random access parameters separately applied to a type 1 UE and a type 2 UE. More specifically, the base station may include both the first parameter set and the second parameter set in a single RACH-ConfigCommon IE, or may separately transmit a RACH-ConfigCommon IE for the type 1 UE and a RACH-ConfigCommon IE for the type 2 UE.

If both the first parameter set and the second parameter set are included in one RACH-ConfigCommon IE, the UE may include the first parameter set within only one RACH-ConfigCommon IE. Examples of the first parameter set may include parameters related to uplink signal generation and transmission (prach-RootSequenceIndex, msg1-Subcarrier-Spacing, msg3-transformPrecoder) and parameters related to uplink signal transmission power (preambleReceivedTargetPower, powerRampingStep). If both the first parameter set and the second parameter set are included in one RACH-ConfigCommon IE, the UE may include one or two second parameter sets in one RACH-configCommon IE. If one is included, it will be used commonly by a NR-lite UE and a normal NR UE; if two are included, the 1st second parameter set may be for a normal NR UE and the 2nd second parameter set may be for an NR-lite UE. Examples of the first parameter set may include parameters specifying the time-frequency resource of the PRACH resource being the physical channel through which the random access preamble is transmitted (prach-ConfigurationIndex, msg1-FDM, msg1-FrequencyStart, etc.), parameters related to determining success or failure of a random access procedure (preambleTransMax, ra-ResponseWindow, ra-ContentionResolutionTimer, etc.), parameters related to beams during random access (rsrp-ThresholdSSB, ssb-perRACH-OccasionAndCB-PreamblesPerSSB, etc.), parameters related to preamble groups (groupBconfigured), or parameters related to repeated transmission for increasing the success rate of preamble transmission of an NR-lite UE.

When using a method of separately transmitting a RACH-ConfigCommon IE for a type 1 UE and a RACH-Config-Common IE (RACH-ConfigCommonLight IE) for a type 2 UE, the two IEs may both be transmitted via an SIB1. Here, for IEs that are not signaled among the component IEs of RACH-ConfigCommon transmitted for a normal UE, predefined values in the standard may be used, in the case of the RACH-ConfigCommonLight IE transmitted for an NR-lite UE, it may be possible to consider that using the same values as the values determined for the identical IEs of RACH-ConfigCommon for the IEs that are not signaled among the component IEs of RACH-ConfigCommonLight. This is to reduce the overhead of parameters transmitted in duplication with the RACH-ConfigCommon IE.

Further, via the SIB1, the UE may be configured (7-05) with values for a delay for receiving/transmitting actual data after scheduling during downlink or uplink transmission as well as random access. That is, parameters related to K0 and K2 described above in FIG. 6 may be separately set for NR-lite UEs.

As an example, for K0, pdsch-TimeDomainAllocation-List and pdsch-TimeDomainAllocationListLight may be included in PDSCH-ConfigCommon transmitted via an SIB1. If only pdsch-TimeDomainAllocationList is included among them, the NR-lite UE may determine K0 with this value; if both pdsch-TimeDomainAllocationList and pdsch-TimeDomainAllocationListLight are included, the NR-lite UE may determine K0 by using pdsch-TimeDomainAllocationListLight; if neither is included, K0 may be determined by using a default (i.e., pre-configured in the UE) table defined in 3GPP TS 38.214.

In addition, for K2, pusch-TimeDomainAllocationList and pusch-TimeDomainAllocationListLight may be included in PUSCH-ConfigCommon transmitted via SIB1. If only pusch-TimeDomainAllocationList is included among them, the NR-lite UE may determine K2 with this value; if both pusch-TimeDomainAllocationList and pusch-TimeDomainAllocationListLight are included, the NR-lite UE may determine K2 by using pusch-TimeDomainAllocationListLight; if neither is included, K2 may be determined by using a default (i.e., pre-configured in the UE) table defined in 3GPP TS 38.214.

Thereafter, when the UE needs to receive downlink data after receiving a paging message from the cell or uplink data to be transmitted is generated, the UE may have to perform (7-07) RRC connection establishment for receiving or transmitting the corresponding data. To this end, the UE needs to perform random access, and the UE may determine PRACH parameters to be used for the random access procedure based on RACH-ConfigCommon and RACH-ConfigCommonLight of SIB1 described above.

That is, to transmit a preamble, the UE may have to select a PRACH resource and may identify (7-09) whether there is a separate RACH configuration for an NR-lite UE. If the base station has separately signaled parameters (prach-ConfigurationIndex, msg1-FDM, msg1-FrequencyStart, etc.) specifying the time-frequency resource of the PRACH resource, the NR-lite UE may transmit (7-11) a preamble via a PRACH resource for the type 2 UE, and then may also select K0 and K2 to be used for transmission and reception of Msg2, Msg3 and Msg4 according to a procedure to be described later.

If only one parameter set (prach-ConfigurationIndex, msg1-FDM, msg1-FrequencyStart, etc.) for specifying the time-frequency resource of the PRACH resource is signaled in RACH-ConfigCommon, the UE may transmit (7-13) a preamble via a common PRACH resource. Then, the UE may also select K0 and K2 to be used for transmission and reception of Msg2, Msg3 and Msg4 according to a procedure to be described later.

After transmitting the preamble, the UE receives an RAR from the base station, and may determine the timing (K0) at which the RAR is actually transmitted after receiving the PDCCH scheduled by a RA-RNTI according to the following conditions. That is, if the NR-lite UE has used a separate PRACH resource for NR-lite when transmitting the preamble and pdsch-TimeDomainAllocationListLight has been signaled, the UE may determine K0 by using pdsch-TimeDomainAllocationListLight and time domain resource assignment information in the PDCCH for RAR scheduling for the UE and receive the RAR. However, if a normal PRACH resource has been used when transmitting the preamble, or if a PRACH resource for NR-lite has been used but pdsch-TimeDomainAllocationListLight is not signaled, when receiving DCI addressed by a RA-RNTI (6-31), the UE may determine K0 by applying the value indicated by the time domain resource assignment of the DCI to PDSCH-TimeDomainResourceAllocationList and receive the RAR by applying K0 correspondingly.

Thereafter, the UE receives a RAR message from the base station according to the above information, where the RAR may include uplink scheduling information for subsequent Msg3 transmission. Here, the UE may transmit Msg3 after determining K2 for Msg3 transmission based on PUSCH-ConfigCommon of SIB1 described above. More specifically, if the NR-lite UE has used a separate PRACH resource for NR-lite when transmitting the preamble and pusch-TimeDomainAllocationListLight has been signaled, the UE may determine K2 by using pusch-TimeDomainAllocationListLight and time domain resource assignment of the UL grant of the RAR and transmit the PUSCH (i.e., Msg3 in this example) (6-35). In other words, it is possible to determine K2 by applying the value indicated by the time domain resource assignment in the UL grant received via a valid RAR to pusch-TimeDomainAllocationListLight, in correspondence to the preamble transmitted by the UE, and PUSCH transmission may be performed by applying K2 correspondingly. However, if a normal PRACH resource has been used when transmitting the preamble, or if a PRACH resource for NR-lite has been used but pusch-TimeDomainAllocationListLight is not signaled, the UE may determine K2 by using pusch-TimeDomainAllocationList and the time domain resource assignment of the RAR UL grant and transmit the PUSCH (i.e., Msg3 in this example) (6-35). In other words, it is possible to determine K2 by applying the value indicated by the time domain resource assignment in the UL grant received via a valid RAR to pusch-TimeDomainAllocationList, in correspondence to the preamble transmitted by the UE, and PUSCH transmission may be performed by applying K2 correspondingly.

Then, after transmitting Msg3, the UE may receive scheduling from the base station and may receive Msg4. Here, the UE may receive Msg4 after determining K0 for Msg4 reception based on PUSCH-ConfigCommon of SIB1 described above. More specifically, if the NR-lite UE has used a separate PRACH resource for NR-lite when transmitting the preamble and pdsch-TimeDomainAllocationListLight has been signaled, the UE may determine K0 by using pdsch-TimeDomainAllocationListLight and time domain resource assignment of the PDCCH (or, downlink control information (DCI)) including UE scheduling information and receive the PDSCH (i.e., Msg4 in this example). However, if a normal PRACH resource has been used when transmitting the preamble, or if a PRACH resource for NR-lite has been used but pdsch-TimeDomainAllocationListLight is not signaled, when receiving DCI addressed by a temporary C-RNTI assigned in Msg2 for Msg4 reception, the UE may determine K0 by applying the value indicated by the time domain resource assignment of the DCI to PDSCH-TimeDomainResourceAllocationList and receive Msg4 by applying K0 correspondingly.

The NR-lite UE may perform random access by determining K0 and K2 as described above, and if parameters separately configured for NR-lite are included in SIB1, it may apply preambleTransMax, ra-ResponseWindow, ra-ContentionResolutionTimer, and RAR window length separately configured for NR-lite to perform RAR reception, Msg3 transmission, and determination of the successfulness of random access. However, if parameters separately configured for NR-lite are not included in SIB1, the UE may apply preambleTransMax, ra-ResponseWindow, ra-ContentionResolutionTimer, and RAR window length for a normal NR UE to perform RAR reception, Msg3 transmission, and determination of the successfulness of random access, thereby completing random access (7-21).

Figure 8:
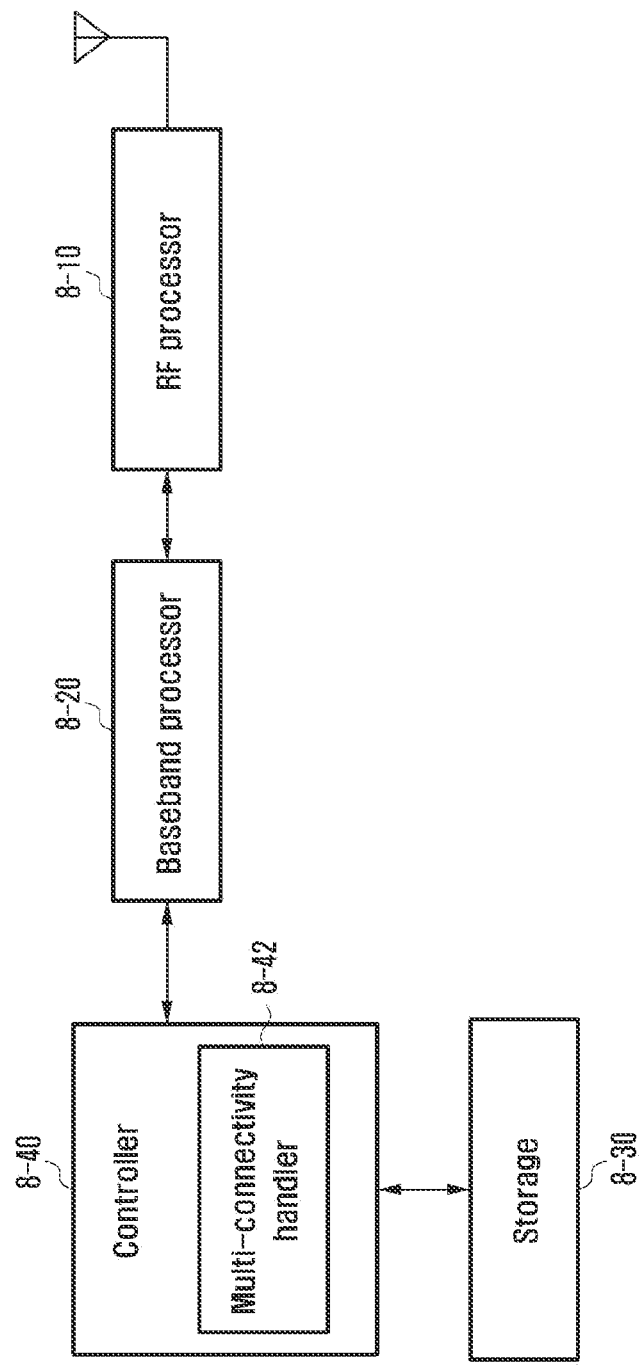
FIG. 8 is a block diagram illustrating the configuration of a UE in a wireless communication system according to an embodiment of the disclosure.

FIG. 8 is a block diagram illustrating the configuration of a UE in a wireless communication system according to an embodiment of the disclosure.

With reference to FIG. 8, the UE may include a radio frequency (RF) processor 8-10, a baseband processor 8-20, a storage 8-30, and a controller 8-40.

The RF processor 8-10 may perform a function for transmitting and receiving a signal through a radio channel, such as signal band conversion and amplification. That is, the RF processor 8-10 may perform up-conversion of a baseband signal provided from the baseband processor 8-20 into an RF-band signal and transmit it through an antenna, and may perform down-conversion of an RF-band signal received through an antenna into a baseband signal. For example, the RF processor 8-10 may include a transmission filter, a reception filter, an amplifier, a mixer, an oscillator, a digital-to-analog converter (DAC), and an analog-to-digital converter (ADC). Although only one antenna is illustrated in FIG. 8, the UE may be provided with a plurality of antennas. Also, the RF processor 8-10 may include a plurality of RF chains. Further, the RF processor 8-10 may perform beamforming. For beamforming, the RF processor 8-10 may adjust phases and magnitudes of signals transmitted and received through the plural antennas or antenna elements.

The baseband processor 8-20 may perform conversion between a baseband signal and a bit string in accordance with the physical layer specification of the system. For example, during data transmission, the baseband processor 8-20 may generate complex symbols by encoding and modulating a transmission bit string. Further, during data reception, the baseband processor 8-20 may restore a reception bit string by demodulating and decoding a baseband signal provided from the RF processor 8-10. For example, in the case of utilizing orthogonal frequency division multiplexing (OFDM), for data transmission, the baseband processor 8-20 may generate complex symbols by encoding and modulating a transmission bit string, map the complex symbols to subcarriers, and compose OFDM symbols through inverse fast Fourier transform (IFFT) operation and cyclic prefix (CP) insertion. Further, for data reception, the baseband processor 8-20 may divide a baseband signal provided from the RF processor 8-10 in units of OFDM symbols, restore the signals mapped to subcarriers through fast Fourier transform (FFT) operation, and restore the reception bit string through demodulation and decoding.

The baseband processor 8-20 and the RF processor 8-10 may transmit and receive signals as described above. Hence, the baseband processor 8-20 and the RF processor 8-10 may be called a transmitter, a receiver, a transceiver, or a communication unit. Further, to support different radio access technologies, at least one of the baseband processor 8-20 or the RF processor 8-10 may include a plurality of communication modules. In addition, to process signals of different frequency bands, at least one of the baseband processor 8-20 or the RF processor 8-10 may include different communication modules. For example, the different radio access technologies may include a wireless LAN (e.g., IEEE 802.11), a cellular network (e.g., LTE), and the like. In addition, the different frequency bands may include a super high frequency (SHF) band) (e.g., 2.5 GHz, 5 GHz) and a millimeter wave (mmWave) band (e.g., 60 GHz).

The storage 8-30 may store data such as basic programs, application programs, and configuration information for the operation of the UE. In particular, the storage 8-30 may store information related to a wireless LAN node performing wireless communication using a wireless LAN access technology. The storage 8-30 may provide stored data in response to a request from the controller 8-40.

The controller 8-40 may control the overall operation of the UE. For example, the controller 8-40 may transmit and receive signals through the baseband processor 8-20 and the RF processor 8-10. Further, the controller 8-40 writes or reads data to or from the storage 8-40. To this end, the controller 8-40 may include at least one processor. For example, the controller 8-40 may include a communication processor (CP) for controlling communication and an application processor (AP) for controlling higher layers such as application programs. According to an embodiment of the disclosure, the controller 8-40 may include a multi-connectivity handler 8-42 that performs processing for operations in multi-connectivity mode.

For example, the controller 8-40 may control the UE to perform the procedure according to UE operations shown in FIGS. 6 and 7. Specifically, the controller 8-40 may be configured to: control the transceiver (8-10, 8-20) to receive system information including a first parameter set for random access of a type 1 UE, a second parameter set for random access of a type 2 UE, and an indicator indicating whether a type 2 UE is supported; identify, when the UE is a type 2 UE, whether it is possible to access a cell having transmitted the system information based on the indicator; and control, in response to identifying that it is possible to access the cell, the transceiver (8-10, 8-20) to transmit a random access preamble based on the second parameter set. Here, the bandwidth supported by the type 2 UE may be less than a first threshold value, and the supported data rate may be less than a second threshold value.

Figure 9:
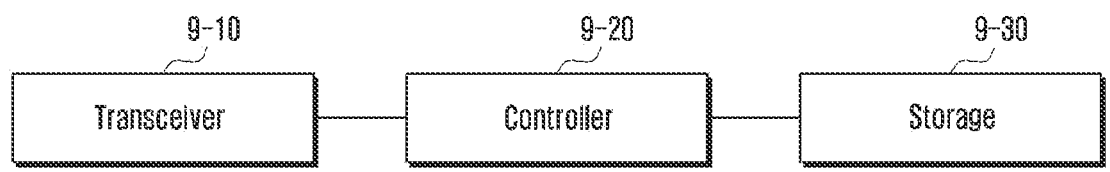
FIG. 9 is a block diagram illustrating the configuration of a base station in a wireless communication system according to an embodiment of the disclosure.

FIG. 9 is a block diagram illustrating the configuration of a base station in a wireless communication system according to an embodiment of the disclosure.

With reference to FIG. 9, the base station may include a transceiver 9-10, a controller 9-20, and a storage 9-30. In the disclosure, the controller may be defined as a circuit, an application specific integrated circuit, or at least one processor.

The transceiver 9-10 may transmit and receive signals to and from other network entities. The transceiver 9-10 may transmit, for example, system information to a UE, and may transmit a synchronization signal or a reference signal.

The controller 9-20 may control the overall operation of the base station according to the embodiment proposed in the disclosure. For example, the controller 9-20 may control signal flows between blocks to perform operations according to the above-described flowchart. Specifically, in a wireless communication system according to an embodiment of the present disclosure, the controller 9-20 may be configured to: control the transceiver 9-10 to transmit system information including a first parameter set for random access of a type 1 UE, a second parameter set for random access of a type 2 UE, and an indicator indicating whether a type 2 UE is supported; and control, when the indicator indicates support of a type 2 UE, the transceiver 9-10 to receive a random access preamble based on the second parameter set from a type 2 UE. Here, the bandwidth supported by the type 2 UE may be less than a first threshold value, and the supported data rate may be less than a second threshold value.

The storage 9-30 may store at least one of information transmitted or received through the transceiver 9-10 or information generated through the controller 9-20.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium may be configured to be executable by one or more processors of an electronic device. The one or more programs may include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

On the other hand, although specific embodiments have been described in the detailed description of the disclosure, various modifications are possible without departing from the scope of the disclosure. Therefore, the scope of the present invention should not be limited to the described embodiments but should be defined by both the claims described below and their equivalents.

The embodiments of the disclosure disclosed in the present specification and drawings are provided as specific examples to easily explain the technical contents of the disclosure and help understanding of the disclosure, and are not intended to limit the scope of the disclosure. It will be apparent to those of ordinary skill in the art to which the disclosure pertains that other modifications can be carried out based on the technical spirit of the disclosure in addition to the embodiments disclosed herein.

The invention claimed is:

1. A method performed by a terminal in a wireless communication system, the method comprising:
   receiving, from a base station, a system information block (SIB) including a first parameter set for a random access and information related to whether the terminal is supported, wherein the terminal is a reduced capability terminal and a bandwidth supported by the reduced capability terminal is limited to a predetermined value;
   identifying whether a cell on which the SIB is received is available to access based on the information;
   in case that the cell is identified to be available to access based on the information, identifying whether the SIB includes a second parameter set for a random access, the second parameter set being associated with the reduced capability terminal;
   in case that the SIB includes the second parameter set for the random access, transmitting, to the base station, a random access preamble based on the second parameter set;
   receiving, from the base station, downlink control information (DCI) associated with a random access-radio network temporary identifier (RA-RNTI);

determining a slot offset between the DCI and a physical downlink shared channel (PDSCH); and receiving, from the base station, a random access response in the PDSCH based on the slot offset, wherein the SIB includes first PDSCH time domain allocation list information and second PDSCH time domain allocation list information, the second PDSCH time domain allocation list information being associated with the reduced capability terminal, and wherein the slot offset is determined based on the second PDSCH time domain allocation list information.

2. The method of claim 1, further comprising:

in case that the SIB does not include the second parameter set for the random access, transmitting, to the base station, a random access preamble based on the first parameter set.

3. The method of claim 1, wherein in case that the SIB does not include the first PDSCH time domain allocation list information and the second PDSCH time domain allocation list information, the slot offset is determined based on a predefined table for downlink time resource allocation.

4. The method of claim 1, wherein the second parameter set includes information indicating a number of repetitions of transmitting the random access preamble.

5. The method of claim 4, wherein the second parameter set further includes information associated with a random access preamble group for the terminal and information on a reference signal received power (RSRP) threshold of synchronization signal and physical broadcast channel (SSB) for the random access of the terminal.

6. A method performed by a base station in a wireless communication system, the method comprising:

transmitting a system information block (SIB) including a first parameter set for a random access and information related to whether a terminal is supported, wherein the terminal is a reduced capability terminal and a bandwidth supported by the reduced capability terminal is limited to a predetermined value;

in case that a cell on which the SIB is transmitted is available for the terminal to access, receiving, from the terminal, a random access preamble, wherein in case that the SIB includes a second parameter set for a random access, the random access preamble is based on the second parameter set, the second parameter set being associated with the reduced capability terminal;

transmitting, to the terminal, downlink control information (DCI) associated with a random access-radio network temporary identifier (RA-RNTI);

determining a slot offset between the DCI and a physical downlink shared channel (PDSCH); and transmitting, to the terminal, the random access response in the PDSCH based on the slot offset, wherein the SIB includes first PDSCH time domain allocation list information and second PDSCH time domain allocation list information, the second PDSCH time domain allocation list information being associated with the reduced capability terminal, and wherein the slot offset is determined based on the second PDSCH time domain allocation list information.

7. The method of claim 6, wherein in case that the SIB does not include the second parameter set for the random access, the random access preamble is associated with the first parameter set.

8. The method of claim 6, wherein the second parameter set includes information indicating a number of repetitions of transmitting the random access preamble.

9. The method of claim 8, wherein the second parameter set further includes information associated with a random access preamble group for the terminal and information on a reference signal received power (RSRP) threshold of synchronization signal and physical broadcast channel (SSB) for the random access of the terminal.

10. The method of claim 6, wherein in case that the SIB does not include the first PDSCH time domain allocation list information and the second PDSCH time domain allocation list information, the slot offset is determined based on a predefined table for downlink time resource allocation.

11. A terminal in a wireless communication system, the terminal comprising:

a transceiver; and a controller configured to:

receive, from a base station via the transceiver, a system information block (SIB) including a first parameter set for a random access and information related to whether the terminal is supported, wherein the terminal is a reduced capability terminal and a bandwidth supported by the reduced capability terminal is limited to a predetermined value, identify whether a cell on which the SIB is received is available to access based on the information, in case that the cell is identified to be available to access based on the information, identify whether the SIB includes a second parameter set for a random access, the second parameter set being associated with the reduced capability terminal, in case that the SIB includes the second parameter set for the random access, transmit, to the base station via the transceiver, a random access preamble based on the second parameter set, receive, from the base station via the transceiver, downlink control information (DCI) associated with a random access-radio network temporary identifier (RA-RNTI), determine a slot offset between the DCI and a physical downlink shared channel (PDSCH), and receive, from the base station via the transceiver, a random access response in the PDSCH based on the slot offset, wherein in case that the SIB includes first PDSCH time domain allocation list information and second PDSCH time domain allocation list information, the slot offset is determined based on the second PDSCH time domain allocation list information, the second PDSCH time domain allocation list information being associated with the reduced capability terminal, and wherein in case that the SIB includes the first PDSCH time domain allocation list information and the SIB does not include the second PDSCH time domain allocation list information, the slot offset is determined based on the first PDSCH time domain allocation list information.

12. The terminal of claim 11, wherein the controller is further configured to:

in case that the SIB does not include the second parameter set for the random access, transmit, to the base station via the transceiver, a random access preamble based on the first parameter set.

13. The terminal of claim 11,
wherein in case that the SIB does not include the first PDSCH time domain allocation list information and the second PDSCH time domain allocation list information, the slot offset is determined based on a predefined table for downlink time resource allocation.

14. The terminal of claim 11,
wherein the second parameter set includes information indicating a number of repetitions of transmitting the random access preamble.

15. The terminal of claim 14, wherein the second parameter set further includes information associated with a random access preamble group for the terminal and information on a reference signal received power (RSRP) threshold of synchronization signal and physical broadcast channel (SSB) for the random access of the terminal.

16. A base station in a wireless communication system, the base station comprising:
a transceiver; and
a controller configured to:
transmit, via the transceiver, a system information block (SIB) including a first parameter set for a random access and information related to whether a terminal is supported, wherein the terminal is a reduced capability terminal and a bandwidth supported by the reduced capability terminal is limited to a predetermined value,
in case that a cell on which the SIB is transmitted is available for the terminal to access, receive, from the terminal via the transceiver, a random access preamble, wherein in case that the SIB includes a second parameter set for a random access of the terminal, the random access preamble is based on the second parameter set, the second parameter set being associated with the reduced capability terminal,
transmit, to the terminal via the transceiver, downlink control information (DCI) associated with a random access-radio network temporary identifier (RA-RNTI),
determine a slot offset between the DCI and a physical downlink shared channel (PDSCH), and
transmit, to the terminal via the transceiver, a random access response in the PDSCH based on the slot offset,
wherein in case that the SIB includes first PDSCH time domain allocation list information and the SIB includes second PDSCH time domain allocation list information, the slot offset is determined based on the second PDSCH time domain allocation list information, the second PDSCH time domain allocation list information being associated with the reduced capability terminal, and
wherein in case that the SIB includes the first PDSCH time domain allocation list information and the SIB does not include the second PDSCH time domain allocation list information, the slot offset is determined based on the first PDSCH time domain allocation list information.

17. The base station of claim 16, wherein in case that the SIB does not include the second parameter set for the random access, the random access preamble is associated with the first parameter set.

18. The base station of claim 16,
wherein in case that the SIB does not include the first PDSCH time domain allocation list information and the second PDSCH time domain allocation list information, the slot offset is determined based on a predefined table for downlink time resource allocation.

19. The base station of claim 16,
wherein the second parameter set includes information indicating a number of repetitions of transmitting the random access preamble.

20. The base station of claim 19, wherein the second parameter set further includes information associated with a random access preamble group for the terminal and information on a reference signal received power (RSRP) threshold of synchronization signal and physical broadcast channel (SSB) for the random access of the terminal.

\* \* \* \* \*